Feb. 9, 1926.
E. N. SARBER
DIRECTION INDICATOR
Filed March 30, 1923
1,572,314
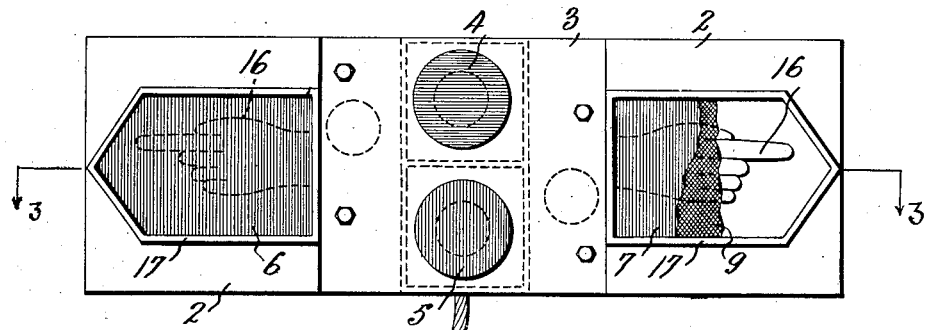
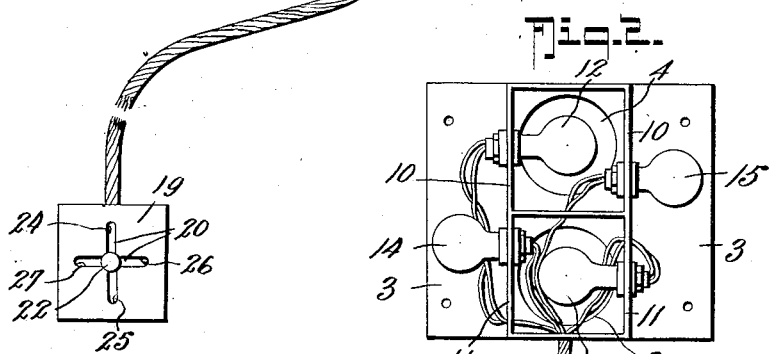
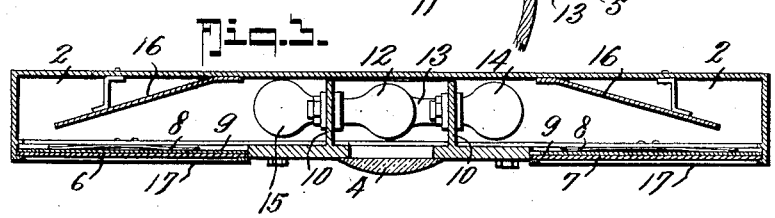
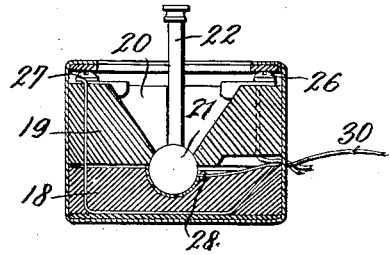
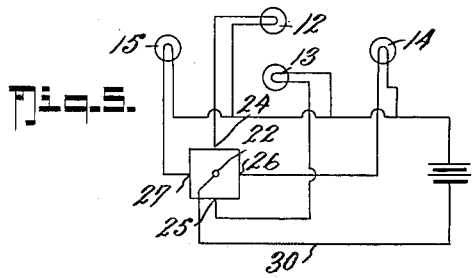
Inventor
Emery N. Sarber.

Patented Feb. 9, 1926.

1,572,314

UNITED STATES PATENT OFFICE.

EMERY N. SARBER, OF BRIGHOUSE, LULU ISLAND, BRITISH COLUMBIA, CANADA.

DIRECTION INDICATOR.

Application filed March 30, 1923. Serial No. 628,829.

*To all whom it may concern:*

Be it known that I, EMERY N. SARBER, citizen of the United States, residing at Brighouse, Lulu Island, in the Province of British Columbia, Canada, have invented certain new and useful Improvements in Direction Indicators, of which the following is a specification.

This invention relates to a movement and direction indicator for automobiles or the like, and is of that class wherein an illuminated sign is displayed from the front end of the vehicle to a pointsman ahead, or from the rear to a following vehicle, or from both, to indicate the driver's intent to move ahead, to stop or to turn to either the right or left.

The invention is fully described in the following specification, reference being made to the drawings by which it is accompanied, in which:

Fig. 1 is a face view of the indicator.

Fig. 2, a view of the medical portion removed from the casing and inverted to show the several lamps.

Fig. 3 is a sectional plan on the line 3—3 in Fig. 1, and

Fig. 4 is an enlarged section of the switch by which the several indicating lamps are controlled.

Fig. 5 is a diagrammatic view of the circuits employed.

In these drawings 2 represents a relatively elongated, shallow, boxlike casing. The medial portion 3 of the front face of this casing is removable, and in it are two lenses 4 and 5 disposed one above the other. One of these, 4, is either white or green glass to indicate an intention to move "ahead" and the other, 5, is red to indicate an intention to "stop".

In the front of the end portions of the casing 2 are glazed windows 6 and 7, preferably angularly pointed outward to indicate intended movement to right and left respectively. The glasses 6 and 7 of these windows are removably inserted in a light frame 17 secured around the aperture in the casing and pass through from the intermediate portion when the front of it 3 is removed and are held within the frame by light springs 8. A gauze screen 9 fits with the glass in each frame, the reason for which will be explained later.

Secured to the back of the frame 2 and directed angularly outward toward the plane of the windows 6 and 7 is a silhouette 16 of a hand with the finger directed outward or other indicia indicating direction. This silhouette is painted white or may be of silvered metal against a dark background.

Secured to the front plate 3 and projecting backward from it to the back of the casing 2 are rectangular walls 10 and 11 providing separate compartments for the "head" and "stop" lenses 4 and 5 and the lamps 12 and 13 for illumining these lenses are secured in the side walls of these compartments, and in the same walls are lamps 14 and 15 for illumining the right and left direction windows 6 and 7 respectively. The several wires serving these lamps are conducted through a common entry to a four contact switch secured to a convenient position on or adjacent the steering wheel of the vehicle.

This switch consists of two blocks 18 and 19 of insulating material, in one of which, 19, is a cross-shaped aperture 20. These blocks are secured together and between them at the centre of the cross-shaped aperture, the ball end 21 of a handled contact arm 22 has its bearing, that the arm may be freely moved into any one of the slots of the cross. One of the wires from each of the directing indicating lamps 12, 13, 14 and 15 is connected to terminal contacts 24, 25, 26 and 27 at the end of each slot of the cross and the other wires from these lamps are connected by one return wire 30, in which is the battery or other source of electrical energy, to the contact arm 22 at 28.

The switch will be placed so that the contacts 24, 25, 26 and 27 will correspond in position with the direction signal to which they are connected: that is, 24 and 25 forward and aft and 26 and 27 right and left.

To render the signals more conspicuous, it is intended that they be illumined in the daytime, as well as at night. It is for this reason the gauze screens 9 are introduced to obscure the view of the directing indicia 16 unless the same is illumined by its lamp. This constitutes an important feature of the invention.

The device is simple, and being free from moving parts, except in the operating switch, is not liable to derangement, and as the movement of the switch coincides with the intended direction of movement, the hand will move naturally to indicate the desired intent and there will be less tendency to error.

Having now particularly described my invention, I hereby declare that what I claim as new and desire to be protected in by Letters Patent, is:

1. A direction indicator for a road vehicle, said indicator comprising a relatively elongated shallow casing the outer plate of which casing has a medial portion removed and has a glazed aperture on each side of the medial space, a plate removably closing the medial space, said plate having a glazed aperture with a wall surrounding it and extending backward to the back of the casing, incandescent lamps secured to the backwardly projecting wall of the medial plate and adapted to separately illumine each glazed aperture of the casing.

2. A direction indicator for a road vehicle, said indicator comprising a relatively elongated shallow casing the outer plate of which casing has a medial portion removed and an aperture on each side of the medial space with a glass retaining frame around the edge of the aperture, a glass removably inserted in the frame, a gauze screen removably inserted with the glass in the same frame, springs holding the glass and its gauze screen against the outer edge of the frame, a plate removably closing the medial space of the casing, said plate having partition walls dividing the casing into compartments, and means supported by the partition walls and projecting into the compartments whereby they may be lighted at will for the purposes specified.

3. A direction indicator casing for road vehicles having a facing plate provided with an open ended window frame at each end thereof and having the central portion between the open ends of the window frames removed, an indicator plate mountable in each window frame, and a closure plate mountable over the central removed portion with the ends thereof abutting the open ends of the window frames serving thereby to retain the indicator plates in position.

In testimony whereof I affix my signature.

EMERY N. SARBER.